United States Patent
Kim et al.

(10) Patent No.: US 8,345,343 B2
(45) Date of Patent: Jan. 1, 2013

(54) REFLECTIVE DISPLAY DEVICE

(75) Inventors: Jung-Woo Kim, Hwaseong-si (KR);
Byong-Gwon Song, Seoul (KR);
Hyuk-Jun Kwon, Seoul (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 91 days.

(21) Appl. No.: 13/069,786

(22) Filed: Mar. 23, 2011

(65) Prior Publication Data
US 2011/0317236 A1    Dec. 29, 2011

(30) Foreign Application Priority Data
Jun. 28, 2010   (KR) .................. 10-2010-0061265

(51) Int. Cl.
*G02F 1/03* (2006.01)
*G02F 1/01* (2006.01)
*G02F 1/13* (2006.01)
(52) U.S. Cl. .................. 359/263; 359/240; 349/198
(58) Field of Classification Search .............. 345/84, 345/87; 349/198; 359/240, 263
See application file for complete search history.

(56) References Cited

U.S. PATENT DOCUMENTS

| 6,798,472 B2 * | 9/2004 | Nagae ........................ 349/106 |
| 2005/0122445 A1 | 6/2005 | Park et al. | |
| 2011/0261294 A1 * | 10/2011 | Jang et al. ........................ 349/86 |

FOREIGN PATENT DOCUMENTS

| JP | 2000111902 A | 4/2000 |
| JP | 2007033744 A | 2/2007 |
| KR | 1020010072492 A | 7/2001 |
| KR | 1020050054216 A | 6/2005 |
| KR | 1020050116174 A | 12/2005 |
| KR | 1020060071020 A | 6/2006 |

* cited by examiner

*Primary Examiner* — David N Spector
(74) *Attorney, Agent, or Firm* — Harness, Dickey & Pierce (57) ABSTRACT

A reflective display device including: a substrate; a reflective layer on the substrate and configured to reflect light incident on the reflective layer; a color filter layer on the reflective layer; and an optical shutter layer on the color filter layer. Each pixel of a plurality of pixels of the reflective display device includes a plurality of sub-pixels and each sub-pixel includes the substrate, the reflective layer, the color filter layer, and the optical shutter layer, and for each pixel, the color filter layer includes a plurality of color filter elements corresponding to colors respectively obtained by the plurality of sub-pixels. At least one of the plurality of color filter elements includes a composite color area including a plurality of white areas configured to let white light pass through them such that the white light is directly reflected by the reflective layer and the plurality of white areas are discontinuously distributed in at least a portion of the composite color area through which light of the obtained colors passes.

18 Claims, 5 Drawing Sheets

REFLECTIVE DISPLAY DEVICE

CROSS-REFERENCE TO RELATED APPLICATIONS

This application claims priority under 35 U.S.C. §119 to Korean Patent Application No. 10-2010-0061265, filed on Jun. 28, 2010, in the Korean Intellectual Property Office, the entire disclosure of which is incorporated herein in its entirety by reference.

BACKGROUND

1. Field

Example embodiments relate to display devices, and more particularly, to reflective display devices using ambient light as a light source.

2. Description of the Related Art

Since reflective display devices may have excellent power consumption characteristics because they do not include a backlight unit (BLU) and a polarization film, unlike transmissive liquid crystal display devices, and may make up for the disadvantages of transmissive display devices because the reflective display devices prevent legibility from being reduced in bright environments. Reflective display devices are used in a variety of products, such as of e-books with e-paper display.

Since reflective display devices use ambient light, reflectance is a relatively important factor. In order to adjust/coincide the reflectance of reflective display devices to the reflectance of paper, newspaper, or the like, which may be a natural reflective display device, many monochrome display devices, most of which use only black and white colors, have been developed. However, consumers are appealed to color display rather than monochrome display and thus some reflective display devices using colors have been suggested. However, color reflective display devices having a satisfactory reflectance have not been developed yet.

Once a reflectance is reduced, brightness, luminosity, or the like is reduced. Although color reproduction is increased by using primary colors, for example, red, green, and blue, having high purity, chroma is reduced due to human visual characteristics, thereby making it difficult for a display device to achieve a desired degree of color accuracy. For example, if even light having high purity, such as light in a short wavelength, is darker than ambient light, colors look dull and muddy.

Accordingly, in order to reproduce colors more effectively, the purity of primary colors needs to be increased and a reflectance needs to be increased for a higher brightness.

SUMMARY

According to an example embodiment, a reflective display device includes a substrate; a reflective layer on the substrate and configured to reflect light incident on the reflective layer; a color filter layer on the reflective layer; and an optical shutter layer on the color filter layer, wherein each pixel of a plurality of pixels of the reflective display device includes a plurality of sub-pixels and each sub-pixel includes the substrate, the reflective layer, the color filter layer, and the optical shutter layer, for each pixel, the color filter layer includes a plurality of color filter elements corresponding to colors respectively obtained by the plurality of sub-pixels, and at least one of the plurality of color filter elements includes a composite color area including a plurality of white areas configured to let white light pass through them such that the white light is directly reflected by the reflective layer, the plurality of white areas being discontinuously distributed in at least a portion of the composite color area through which light of the obtained colors passes.

According to an example embodiment, the reflective layer includes bottom portions and protruding portions protruding from the bottom portions, the bottom portions and the protruding portions being in a region corresponding to the composite color area, wherein the white areas are on at least one of the bottom portions and the protruding portions and the color areas are on the remaining one of the bottom portions and the protruding portions of the reflective layer.

According to an example embodiment, the protruding portions protrude in a stepped shape from the bottom portions, the color areas in the composite color area are on the protruding portions and include a color filter material, and the white areas in the composite color area are on the bottom portions and do not include a color filter material.

According to an example embodiment, top surfaces of at least one of the bottom portions and the protruding portions are curved.

According to an example embodiment, the bottom portions and the protruding portions are connected to each other, and the protruding portions protrude in a mountain top-like shape from the bottom portions, the color filter layer in the composite color areas has a thickness that is greater on the bottom portions and decreases toward upper portions of the protruding portions, and in the composite color area, the mountain-top-like portions of the protruding portions correspond to the white areas and portions of the color filter layer on remaining portions of the protruding portions other than the mountain-top-like portions and the bottom portions correspond to the color areas.

According to an example embodiment, the reflective layer is configured to function as a sub-pixel electrode or a pixel electrode, and the reflective display device further includes: a driving unit on the substrate between the substrate and the reflective layer and configured to drive the sub-pixels, a counter transparent substrate including a transparent electrode on a surface of the counter transparent substrate facing the substrate such that the optical shutter layer is between the counter transparent substrate and the substrate.

According to an example embodiment, a protective layer is on the substrate and is configured to cover the driving unit, and the reflective layer is on the protective layer.

According to an example embodiment, the reflective display device further includes a concavo-convex layer on a top surface of the protective layer, the concavo-convex layer being of desired contours corresponding to the bottom portions and the protruding portions, wherein the reflective layer exhibits the desired contours of the concavo-convex layer.

According to an example embodiment, a protective layer is on the substrate, and the reflective layer is on the protective layer.

According to an example embodiment, the reflective display device further includes a concavo-convex layer of desired contours corresponding to the bottom portions and the protruding portions, wherein the reflective layer exhibits the desired contours of the concavo-convex layer.

According to an example embodiment, the reflective display device further includes a counter transparent substrate facing the substrate such that the optical shutter layer is between the counter transparent substrate and the substrate.

According to an example embodiment, a reflective display device includes a substrate; a driving unit on the substrate; a reflective layer configured as a sub-pixel electrode or a pixel electrode to which a voltage is applied by the driving unit, the reflective layer being over the driving unit, and configured to reflect light incident on the reflective layer; a color filter layer on the reflective layer; an optical shutter layer on the color filter layer; and a counter transparent substrate including a transparent electrode on a surface of the counter transparent substrate facing the substrate such that the reflective layer, the color filter layer, and the optical shutter layer are between the counter transparent substrate and the substrate, wherein each pixel of a plurality of pixels of the reflective display device includes a plurality of sub-pixels and each sub-pixel includes the substrate, the driving unit, the reflective layer, the color filter, the optical shutter layer, and the counter transparent substrate, for each pixel, the color filter layer includes a plurality of color filter elements corresponding to colors respectively obtained by the plurality of sub-pixels, and at least one of the plurality of color filter elements includes a composite color area including a plurality of white areas configured to let white light pass through them such that the white light is directly reflected by the reflective layer, the plurality of white areas being discontinuously distributed in at least a portion of the composite color areas through which light of the obtained colors passes.

According to an example embodiment, the reflective layer includes bottom portions and protruding portions protruding from the bottom portions, the bottom portions and the protruding portions being in a region corresponding to the composite color area, and the white areas are on at least one of the bottom portions and the protruding portions and the color areas are on the remaining one of the bottom portions and the protruding portions of the reflective layer.

According to an example embodiment, the protruding portions protrude in a stepped shape from the bottom portions, the color areas in the composite color area are on the protruding portions and include a color filter material, and the white areas in the composite color area are on the bottom portions and do not include a color filter material.

According to an example embodiment, top surfaces of at least one of the bottom portions and the protruding portions are curved.

According to an example embodiment, the bottom portions and the protruding portions are connected to each other, and the protruding portions protrude in a mountaintop-like shape from the bottom portions, the color filter layer in the composite color area has a thickness that is greater on the bottom portions and decreases toward upper portions of the protruding portions, and in the composite color areas, the mountaintop-like portions of the protruding portions correspond to the white areas and portions of the color filter layer on remaining portions of the protruding portions other than the mountaintop-like portions and the bottom portions correspond to the color areas.

According to an example embodiment, a protective layer is on the substrate and is configured to cover the driving unit, and the reflective layer is on the protective layer.

According to an example embodiment, the reflective display device further includes a concavo-convex layer on a top surface of the protective layer, the concavo-convex layer being of desired contours corresponding to the bottom portions and the protruding portions, wherein the reflective layer exhibits the desired contours of the concavo-convex layer.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In order to increase the purity clarity of primary colors and achieve high brightness, reflectance may be increased by independently adding white to primary colors, for example, red, green, and blue. However, since chroma varies according to the location of white and a ratio of mixed colors, it is difficult to achieve uniform color reproduction. Also, if white is added to an independent area in order to increase a reflectance, an area for primary colors is reduced, thereby failing to achieve good color reproduction.

Accordingly, uniform color reproduction may be achieved by including white in primary colors instead of adding white to an independent area, in order to increase reflectance, and reflectance may be increased effectively by improving a structure of a reflective layer.

Figure 1:
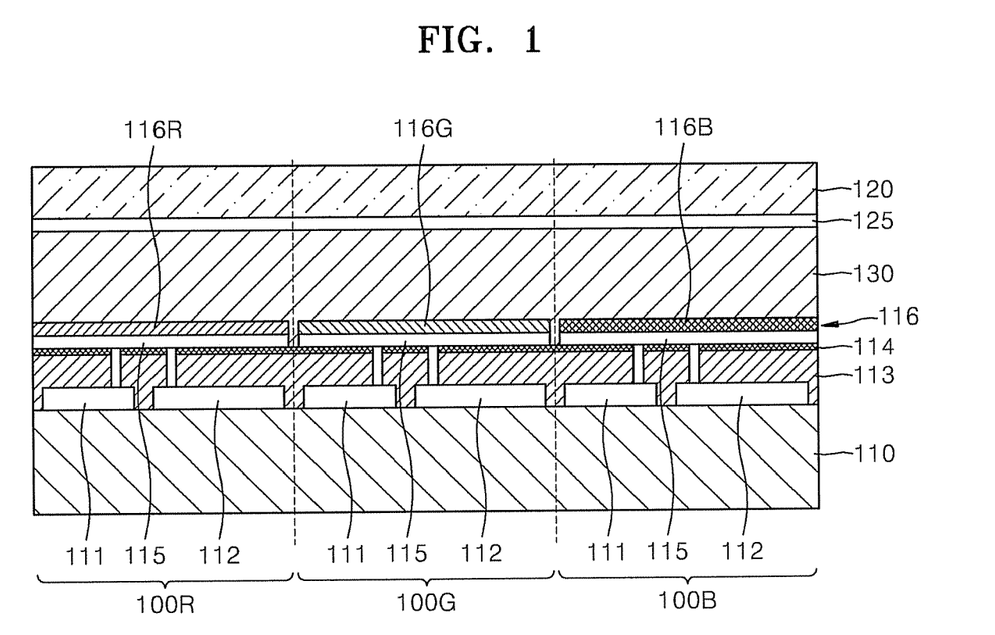
FIG. 1 is a cross-sectional view of a reflective display device according to an example embodiment.
Figure 2:
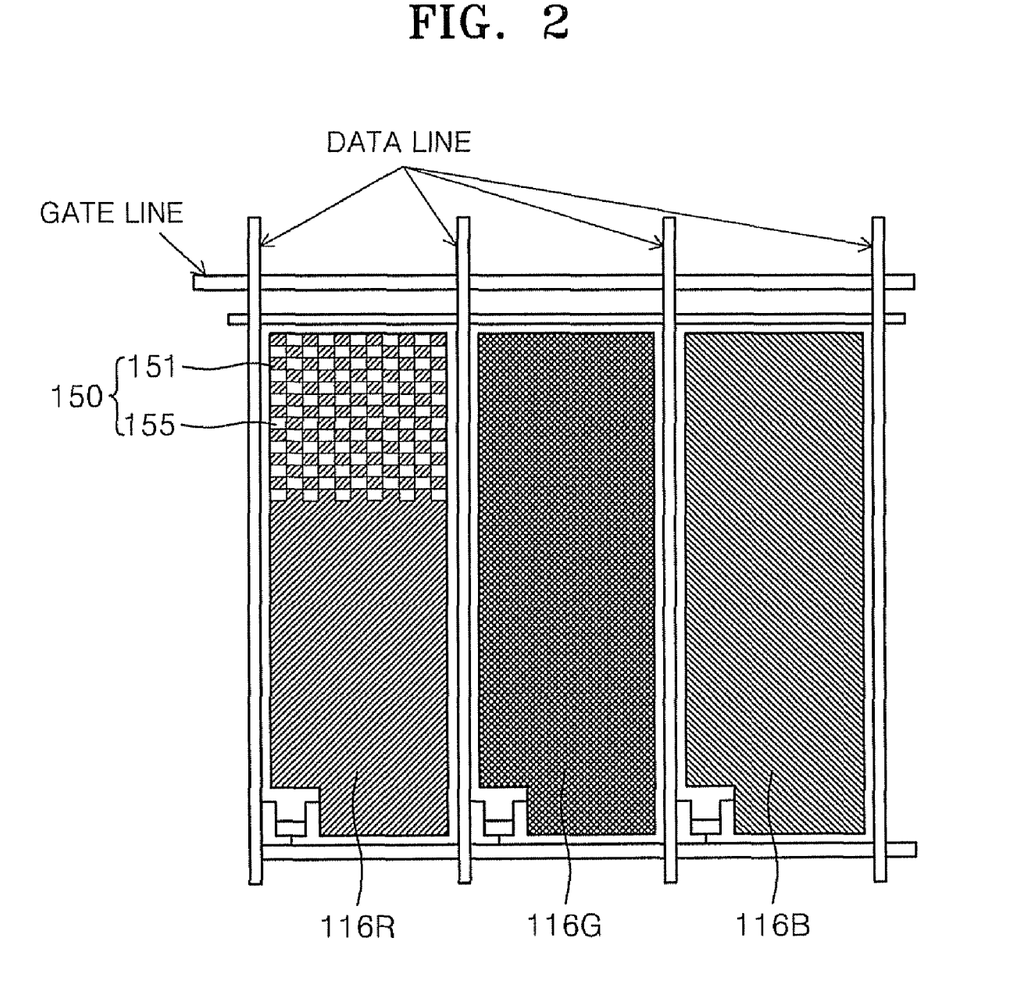
FIGS. 2 through 4 are views illustrating structures of a color filter layer of one pixel of FIG. 1, according to example embodiments.
Figure 3:
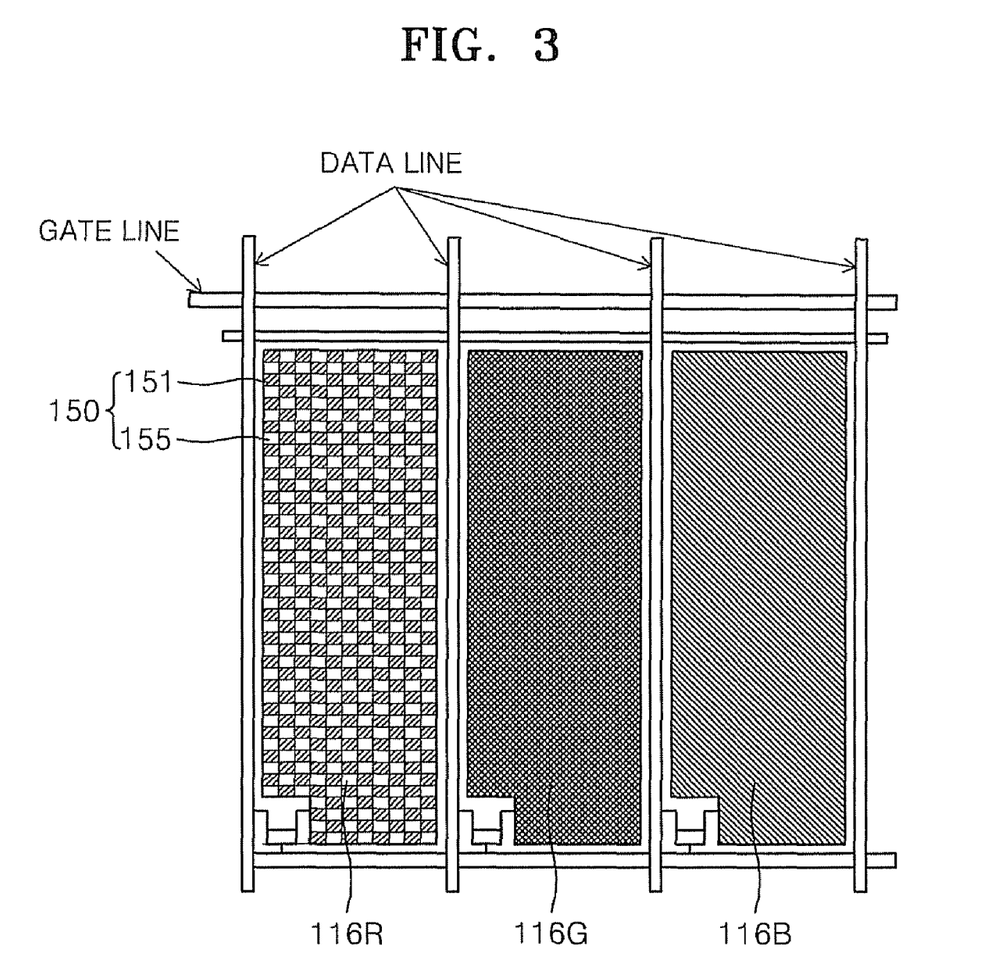
Figure 4:
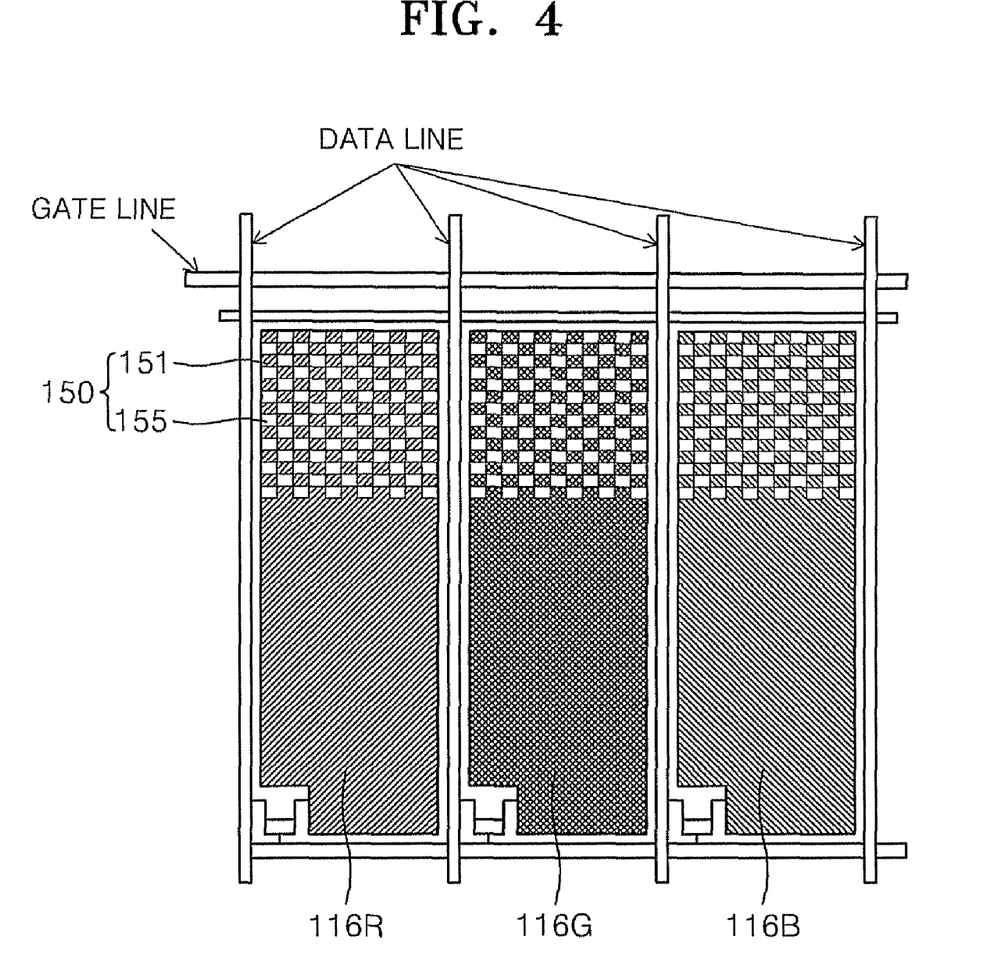

FIG. 1 is a cross-sectional view of a reflective display device according to an example embodiment. FIGS. 2 through 4 are views illustrating structures of a color filter layer 116 of one pixel of FIG. 1, according to example embodiments.

Referring to FIGS. 1 through 4, the reflective display device may include a substrate 110, a reflective layer 115 disposed on the substrate 110 and designed to reflect light incident on the reflective layer 115, the color filter layer 116 disposed on the reflective layer 115, and an optical shutter layer 130 disposed on the color filter layer 116. The reflective display device has a plurality of pixels. Each of the plurality of pixels includes a plurality of sub-pixels. For example, each of the plurality of pixels may include a red sub-pixel 100R, a green sub-pixel 100G, and/or a blue sub-pixel 100B. Only one pixel of the reflective display device is illustrated in FIG. 1 for convenience. The color filter layer 116 includes a plurality of color filter elements corresponding to colors respectively obtained by the plurality of sub-pixels per unit pixel. If each pixel includes the red sub-pixel 100R, the green sub-pixel 100G, and/or the blue sub-pixel 100B, the color filter layer 116 includes a red color filter element 116R, a green color filter element 116G, and a blue color filter element 116B per unit pixel. As shown in the example embodiments of FIGS. 2 through 4, at least a portion of at least one of the plurality of color filter elements, namely, the red color filter element 116R, the green color filter element 116G, and the blue color filter element 116B, includes a composite color area 150 including a plurality of white areas 155 which enable white light to be directly reflected by the reflective layer 115 and are discontinuously distributed in color areas 151 through which only light of the obtained colors passes.

The substrate 110, which is a lower substrate, may be a transparent or opaque substrate. For example, the substrate 110 may be a plastic substrate, a glass substrate, a metal substrate, or the like. If the substrate 110 is a plastic substrate, the reflective display device may be a flexible reflective display device.

A driving unit for driving the sub-pixels, namely, the red sub-pixel 100R, the green sub-pixel 100G, and the blue sub-pixel 100B, may be disposed on the substrate 110 between the substrate 110 and the reflective layer 115. The reflective layer 115 may act as a pixel electrode or a sub-pixel electrode, and the driving unit applies a voltage to the reflective layer 115 acting as a pixel electrode or a sub-pixel electrode. For example, if the red, green, and blue sub-pixels 100R, 100G, and 100B are to be simultaneously driven, the driving unit may be disposed to drive each of the red, green, and blue sub-pixels 100R, 100G, and 100B, and the reflective layer 115 may be disposed to act as a sub-pixel electrode. If the red, green, and blue sub-pixels 100R, 100G, and 100B are to be sequentially driven, the driving unit may be disposed to drive each of the red, green, and blue sub-pixels 100R, 100G, and 100B, and the reflective layer 115 may be disposed to act as a pixel electrode or a sub-pixel electrode.

In FIG. 1, the driving unit and the reflective layer 115 are disposed to correspond to each of the red, green, and blue sub-pixels 100R, 100G, and 100B. A case where the reflective layer 115 is disposed to correspond to any of the red, green, and blue sub-pixels 100R, 100G and 100B as necessary will be explained. The driving unit may include, for example, thin-film transistors (TFTs) 111, storage capacitors 112, and the like. Here, the TFTs 111 may be organic TFTs, amorphous silicon (a-Si) TFTs, polysilicon (poly-Si) TFTs, oxide TFTs, or the like. However, example embodiments are not limited thereto and the TFTs 111 may be any of various other TFTs. The storage capacitors 112 maintain an applied voltage to the reflective layer 115 during a predetermined/desired image display period.

Because the reflective display device is reflective, the TFTs 111 and the storage capacitors 112 may be formed on the substrate 110 to have areas large enough to cover most of, for example, areas for the red, green, and blue sub-pixels 100R, 100G, and 100B. Accordingly, the TFTs 111 each having a large channel width may be formed on the substrate 110, and also the storage capacitors 112 each having a large area may be formed on the substrate 110. Accordingly, as the channel widths of the TFTs 111 are increased, drain current may be increased. If the TFTs 111 have large channel widths, even though the TFTs 111 are TFTs each having a low mobility, such as organic TFTs or a-Si TFTs, the reflective display device may be driven efficiently. Also, since electrode areas of the storage capacitors 112 are increased, even though the reflective display device is a display device having a low voltage holding ratio (VHR), such as a polymer dispersed liquid crystal (PDLC) device, the reflective display device may be driven efficiently, thereby improving display quality.

A protective layer 113 may be formed on a top surface of the substrate 110 to cover the driving unit including the storage capacitors 112 and the TFTs 111. The protective layer 113 may be formed of any of various materials such as silicon oxide, silicon nitride, and/or organic material. The reflective layer 115 is formed on the protective layer 113 to correspond to the red, green, and blue sub-pixels 100R, 100G, and 100B. Here, the reflective layer 115 is substantially disposed over the driving unit including the TFTs 111 and the storage capacitors 112.

The reflective layer 115 may be formed by depositing a metal thin film on the protective layer 113. The metal thin film may be formed of, for example, aluminum (Al) or molybdenum (Mo), but the example embodiments are not limited thereto. Accordingly, the reflective layer 115 formed of a metal thin film acts as a pixel electrode or a sub-pixel electrode to which a voltage is applied by the driving unit, and is designed to reflect light externally incident on the reflective layer 115. The reflective layer 115 may be electrically connected to the driving unit including the TFTs 111 and the storage capacitors 112 through via holes formed in the protective layer 113.

Figure 5:
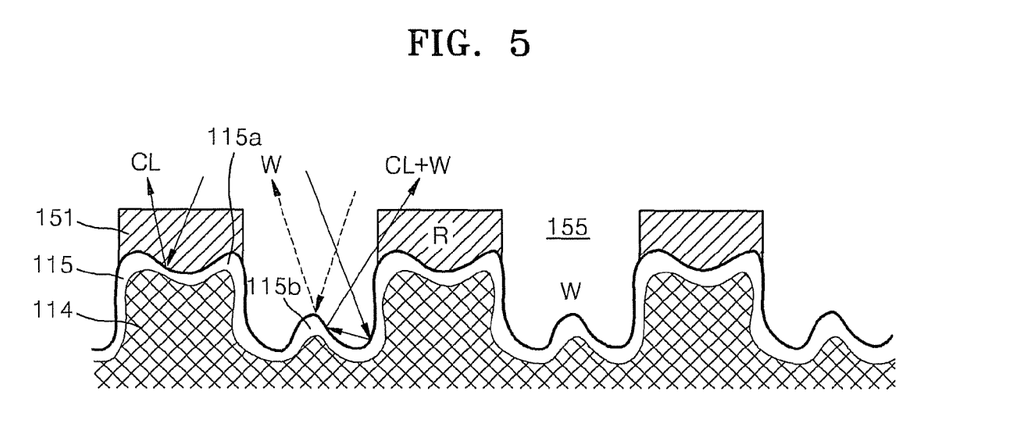
FIG. 5 is a cross-sectional view illustrating a case where a composite color area is formed on a reflective layer that has bottom portions and portions protruding in a stepped shape from the bottom portions.
Figure 6:
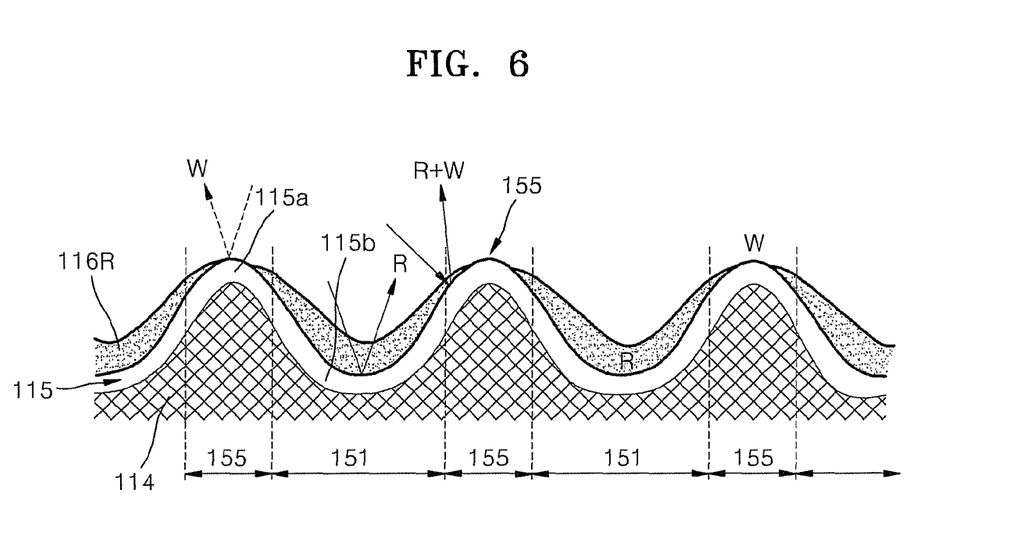
FIG. 6 is a cross-sectional view illustrating a case where a composite color area is formed on a reflective layer that has bottom portions and protruding portions connected to the bottom portions and protruding in a mountaintop-like shape from the bottom portions.

Referring to FIGS. 5 and 6, the reflective layer 115 may be formed to have bottom portions 115b and protruding portions 115a protruding from the bottom portions 115b in a region corresponding to at least the composite color area 150 of the color filter layer 116. FIG. 5 illustrates a case where the protruding portions 115a protrude in a stepped shape from the bottom portions 115b. As shown in FIG. 5, if the protruding portions 115a protrude in the stepped shape from the bottom portions 115b, top surfaces of at least one of the protruding portions 115a and the bottom portions 115b may be additionally curved surfaces. In FIG. 5, the reflective layer 115 has the bottom portions 115b and the protruding portions 115a both of which have curved top surfaces, that is, concavo-convex surfaces. In FIG. 6, the bottom portions 115b and the protruding portions 115a are connected to each other. Accordingly, the protruding portions 115a may protrude in a mountaintop-like shape from the bottom portions 115b.

The reflective layer 115 may be formed by forming a concavo-convex layer 114 on a top surface of the protective layer 113 to have desired contours corresponding to the bottom portions 115b and the protruding portions 115a, and relatively thinly depositing a metal thin film on the concavo-convex layer 114 to show the contours of the concavo-convex layer 114.

If the concavo-convex layer 114 is formed and the reflective layer 115 is relatively thinly formed to show the contours of the concavo-convex layer 114, the concavo-convex layer 114 may have, in a region corresponding to at least the composite color area 150 of the color filter layer 116, the contours corresponding to the bottom portions 115b and the protruding portions 115a protruding from the bottom portions 115b as shown in FIGS. 5 and 6. Then, if the reflective layer 115 is formed on the concavo-convex layer 114 to show the contours of the concavo-convex layer 114, the reflective layer 115 may have, at a region corresponding to at least the composite color area 150 of the color filter layer 116, the bottom portions 115b and the protruding portions 115a protruding from the bottom portions 115b.

Here, the concavo-convex layer 114 and the reflective layer 115 showing the contours of the concavo-convex layer 114 may be formed such that the bottom portions 115b and the protruding portions 115a are formed only in a region corresponding to the composite color area 150 of the color filter layer 116, or may be fowled such that the bottom portions 115b and the protruding portions 115a are formed over the entire reflective layer 115. Also, the concavo-convex layer 114 and the reflective layer 115 showing the contours of the concavo-convex layer 114 may be formed such that the bottom portions 115b and the protruding portions 115a constructed as shown in FIG. 5 or 6 are formed only in a region corresponding to the composite color area 150 of the color filter layer 116, and are formed to have other frequencies, pattern depths, and the like in other areas.

The concavo-convex layer 114 having the contours in the aforesaid various embodiments may be formed by coating a photosensitive material on the top surface of the protective layer 113 and patterning a resultant structure by using photolithography. The reflective layer 115 may be formed by relatively thinly depositing a metal thin film on a top surface of the concavo-convex layer 114 to show the contours of the concavo-convex layer 114.

Alternatively, without the help of the concavo-convex layer 114, the reflective layer 115 may be formed by relatively thickly depositing a metal thin film and patterning a resultant structure so that the bottom portions 115b and the protruding portions 115a protruding from the bottom portions 115b are formed in a region corresponding to at least the composite color area 150 of the color filter layer 116.

The color filter layer 116 is formed on the reflective layer 115. The color filter layer 116 includes the plurality of color filter elements, for example, the red color filter element 116R, the green color filter element 116G, and the blue color filter element 116b corresponding to colors respectively obtained by red, green, and blue sub-pixels 100R, 100G, and 100B per unit pixel. At least a part of at least one of the plurality of color filter elements, that is, the red color filter element 116R, the green color filter element 116G, and the blue color filter element 116B, includes the composite color area 150. In the composite color area 150, the plurality of white areas 155 which enable white light to be directly reflected by the reflective layer 115 are discontinuously distributed in the color areas 151 through which light of the obtained colors passes.

For example, the red color filter element 116R is formed on a top surface of the reflective layer 115 corresponding to the red sub-pixel 100R, the green color filter element 116G is formed on a top surface of the reflective layer 115 corresponding to the green sub-pixel 100G, and the blue color filter element 116B is formed on a top surface of the reflective layer 115 corresponding to the blue sub-pixel 100B. The composite color area 115 including the plurality of white areas 155 that are discontinuously formed is aimed in at least a part of at least one of the red color filter element 116R, the green color filter element 116G, and the blue color filter element 116B.

That is, as shown in FIGS. 2 through 4, the composite color area 150 may be formed in at least a part of at least one of the red color filter element 116R, the green color filter element 116G, and the blue color filter element 116B.

FIG. 2 illustrates a case where the composite color area 150 is formed only in a part of the red color filter element 116R. Alternatively, the composite color area 150 may be formed over the entire red color filter element 116R as shown in FIG. 3. Alternatively, the composite color area 150 may be formed in a part of each of the red color filter element 116R, the green color filter element 116G, and the blue color filter element 116B as shown in FIG. 4.

Accordingly, the composite color area 150 may be formed in a part of at least one of the red color filter element 116R, the green color filter element 116G, and the blue color filter element 116B. Alternatively, the composite color area 150 may be formed entirely in at least one of the red color filter element 116R, the green color filter element 116G, and the blue color filter element 116B.

FIGS. 5 and 6 are enlarged cross-sectional views illustrating a part of the composite color area 150 in a color filter element. In FIGS. 5 and 6, in order to improve reflection efficiency, a structure of the reflective layer 115 and a structure of the color filter layer 116 are integrated with each other.

As shown in FIG. 5, for the reflective layer 115 to include the protruding portions 115a only on which a color filter material is disposed and the bottom portions 115b on which no color filter material is disposed, the composite color area 150 may be formed by exposure, printing, transfer, or the like.

That is, the color areas 151 may be formed such that a color filter material is disposed only on the protruding portions 115a of the reflective layer 115 and the composite color area 150 may be formed such that no color filter material is disposed on the bottom portions 115b. The bottom portions 115b on which no color filter material is disposed correspond to the white areas 155. Here, the color filter element may be at least one of the red color filter element 116R, the green color filter element 116G, and the blue color filter element 116B. If the composite color area 150 is formed only in a part of the color filter element (116R, 116G, 116B), the color areas 151 on which the color filter material is disposed may be formed in regions other than the composite color area 150.

In this structure, light is reflected in three paths, and thus not only a color and white, but also a mixture of a color and white may be realized. If incident light is affected only by the reflective layer 115, that is, if the incident light passes through only areas corresponding to the bottom portions 115b, white may be reproduced. If incident light is incident on the color areas 151 and reflected by the color areas 151, a specific color, for example, red, green, or blue may be reproduced. Also, if light incident on the reflective layer 115 is reflected by the reflective layer 115 and exits through the color areas 151, a mixture of white and a specific color may be reproduced. Also, if light incident on the color areas 151 is reflected by the color areas 151 and passes through areas corresponding to the bottom portions 115b, that is, the white areas 155, a mixture of white and a specific color may also be reproduced.

Accordingly, when white light is incident on the color filter layer 116, if color light CL from among light incident on a predetermined/desired color filter element is incident on the protruding portions 115a of the reflective layer 115 and is reflected by the protruding portions 115a, since the specific color light CL may pass twice through the color areas 151 on which a color filter material is disposed, a color may be sufficiently filtered and emitted as color light. White light incident on the white areas 155 is reflected by the bottom portions 115b of the reflective layer 115, and may be emitted as white light or may pass once the color areas 151 formed on adjacent protruding portions 115a to be emitted, as a mixture of color light and white light. Also, from among white light incident on the color areas 151, light passing through the color areas 151, incident on the bottom portions 115b of the reflective layer 115, and reflected by the bottom portions 115b may also be emitted as a mixture of color light and white light.

In the composite color area 150 formed in the red color filter element 116R, the color light CL becomes red light R. In the composite color area 150 formed in the green color filter element 116G, the color light CL becomes green light G. In the composite color area 150 formed in the blue color filter element 116B, the color light CL becomes blue light B.

As shown in FIG. 5, the composite color area 150 of the color filter element may be formed by exposure, printing, transfer, or the like in accordance with the formation and structure of the reflective layer 115, and may directly use the structure of the reflective layer 115 without forming areas for white light.

As shown in FIG. 6, if the bottom portions 115b and the protruding portions 115a are connected to each other and the protruding portions 115a protrude in a mountaintop-like shape from the bottom portions 115b, the composite color area 150 of the color filter element may be formed by, for example, spin coating. That is, the color filter layer 116 may be formed by spin-coating an appropriate amount of color filter material on the structure of the reflective layer 115 without separately making a pattern. In this case, the reflective layer 115 is naturally divided into portions which are exposed through the color filter layer 116 and portions on which the color filter layer 116 is formed. The thickness of the color filter layer 116 varies according to locations of these portions. The portions which are exposed through the color filter layer 116, that is, mountaintop-like portions of the protruding portions 115a correspond to the white areas 155, and the remaining portions on which the color filter layer 116 is formed, that is, portions around the mountaintop-like portions of the protruding portions 115a and the bottom portions 115b correspond to the color areas 151.

Even when the composite color area 150 is constructed as shown in FIG. 6, a color, white, and a mixture of white and a color may be reproduced. That is, light incident on the mountaintop-like portions of the protruding portions 115a which are exposed or passing through portions of the color filter layer 116 of which the thickness is relatively great may reproduce white and red, and light passing through portions of the color filter layer 116 of which the thickness is relatively small may reproduce a mixture of white and a color.

Although the red, green, and blue color filter elements 116R, 116G, and 116B are formed in the aforesaid embodiments, the example embodiments is not limited thereto and various other color filter elements may be formed.

According to the reflective display device of the example embodiments as described above, since the white areas 155 are discontinuously distributed in at least a part of the color areas 151 for realizing primary colors, for example, red, green, and blue color, a high reflectance may be obtained and a color with high chroma may be reproduced.

Referring back to FIG. 1, the reflective display device may further include a counter transparent substrate 120 having a transparent electrode 125 formed on a surface of the counter transparent substrate 120 facing the substrate 110. In this case, the optical shutter layer 130 is located between the substrate 110 and the counter transparent substrate 120.

The counter transparent substrate 120 may be, for example, an organic substrate or a plastic substrate. The transparent electrode 125 may be a common electrode formed of, for example, indium tin oxide (ITO), or any of various other transparent conductive materials.

The optical shutter layer 130 may be, for example, a PDLC layer. The PDLC layer may include a polymer and liquid crystals uniformly dispersed in the polymer. If an electric field is applied to the PDLC layer, refractive indices of the liquid crystals and the polymer are changed, thereby scattering or transmitting light. The PDLC layer may be obtained by emitting ultraviolet rays to a solution in which a photo-polymerization material, such as monomer or oligomer, and liquid crystals are mixed and curing the solution.

As described above, according to the reflective display device of example embodiments, since white areas are discontinuously distributed in at least a portion of color areas for realizing primary colors, such as red, green, and blue colors, a high reflectance may be obtained and a color with high chroma may be reproduced.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A reflective display device comprising:
   a substrate;
   a reflective layer on the substrate and configured to reflect light incident on the reflective layer;
   a color filter layer on the reflective layer; and
   an optical shutter layer on the color filter layer, wherein
      each pixel of a plurality of pixels of the reflective display device includes a plurality of sub-pixels and each sub-pixel includes the substrate, the reflective layer, the color filter layer, and the optical shutter layer,
      for each pixel, the color filter layer includes a plurality of color filter elements corresponding to colors respectively obtained by the plurality of sub-pixels, and
      at least one of the plurality of color filter elements includes a composite color area including a plurality of white areas configured to let white light pass through them such that the white light is directly reflected by the reflective layer, the plurality of white areas being discontinuously distributed in at least a portion of the composite color area through which light of the obtained colors passes.

2. The reflective display device of claim 1, wherein
the reflective layer includes bottom portions and protruding portions protruding from the bottom portions, the bottom portions and the protruding portions being in a region corresponding to the composite color area,
wherein the white areas are on at least one of the bottom portions and the protruding portions and the color areas are on the remaining one of the bottom portions and the protruding portions of the reflective layer.

3. The reflective display device of claim 2, wherein
the bottom portions and the protruding portions are connected to each other, and the protruding portions protrude in a mountain top-like shape from the bottom portions,
the color filter layer in the composite color areas has a thickness that is greater on the bottom portions and decreases toward upper portions of the protruding portions, and
in the composite color area, the mountaintop-like portions of the protruding portions correspond to the white areas and portions of the color filter layer on remaining portions of the protruding portions other than the mountaintop-like portions and the bottom portions correspond to the color areas.

4. The reflective display device of claim 2, wherein
the protruding portions protrude in a stepped shape from the bottom portions,
the color areas in the composite color area are on the protruding portions and include a color filter material, and
the white areas in the composite color area are on the bottom portions and do not include a color filter material.

5. The reflective display device of claim 3, wherein top surfaces of at least one of the bottom portions and the protruding portions are curved.

6. The reflective display device of claim 2, wherein
the reflective layer is configured to function as a sub-pixel electrode or a pixel electrode, and
the reflective display device further includes:
a driving unit on the substrate between the substrate and the reflective layer and configured to drive the sub-pixels,
a counter transparent substrate including a transparent electrode on a surface of the counter transparent substrate facing the substrate such that the optical shutter layer is between the counter transparent substrate and the substrate.

7. The reflective display device of claim 6, wherein a protective layer is on the substrate and is configured to cover the driving unit, and the reflective layer is on the protective layer.

8. The reflective display device of claim 7, further comprising a concavo-convex layer on a top surface of the protective layer, the concavo-convex layer being of desired contours corresponding to the bottom portions and the protruding portions,
wherein the reflective layer exhibits the desired contours of the concavo-convex layer.

9. The reflective display device of claim 2, wherein a protective layer is on the substrate, and the reflective layer is on the protective layer.

10. The reflective display device of claim 9, further comprising a concavo-convex layer of desired contours corresponding to the bottom portions and the protruding portions,
wherein the reflective layer exhibits the desired contours of the concavo-convex layer.

11. The reflective display device of claim 10, further comprising a counter transparent substrate facing the substrate such that the optical shutter layer is between the counter transparent substrate and the substrate.

12. A reflective display device comprising:
a substrate;
a driving unit on the substrate;
a reflective layer configured as a sub-pixel electrode or a pixel electrode to which a voltage is applied by the driving unit, the reflective layer being over the driving unit, and configured to reflect light incident on the reflective layer;
a color filter layer on the reflective layer;
an optical shutter layer on the color filter layer; and
a counter transparent substrate including a transparent electrode on a surface of the counter transparent substrate facing the substrate such that the reflective layer, the color filter layer, and the optical shutter layer are between the counter transparent substrate and the substrate, wherein
each pixel of a plurality of pixels of the reflective display device includes a plurality of sub-pixels and each sub-pixel includes the substrate, the driving unit, the reflective layer, the color filter, the optical shutter layer, and the counter transparent substrate,
for each pixel, the color filter layer includes a plurality of color filter elements corresponding to colors respectively obtained by the plurality of sub-pixels, and
at least one of the plurality of color filter elements includes a composite color area including a plurality of white areas configured to let white light pass through them such that the white light is directly reflected by the reflective layer, the plurality of white areas being discontinuously distributed in at least a portion of the composite color areas through which light of the obtained colors passes.

13. The reflective display device of claim 12, wherein a protective layer is on the substrate and is configured to cover the driving unit, and the reflective layer is on the protective layer.

14. The reflective display device of claim 13, further comprising a concavo-convex layer on a top surface of the protective layer, the concavo-convex layer being of desired contours corresponding to the bottom portions and the protruding portions,
wherein the reflective layer exhibits the desired contours of the concavo-convex layer.

15. The reflective display device of claim 12, wherein
the reflective layer includes bottom portions and protruding portions protruding from the bottom portions, the bottom portions and the protruding portions being in a region corresponding to the composite color area, and
the white areas are on at least one of the bottom portions and the protruding portions and the color areas are on the remaining one of the bottom portions and the protruding portions of the reflective layer.

16. The reflective display device of claim 15, wherein
the bottom portions and the protruding portions are connected to each other, and the protruding portions protrude in a mountaintop-like shape from the bottom portions,
the color filter layer in the composite color area has a thickness that is greater on the bottom portions and decreases toward upper portions of the protruding portions, and
in the composite color areas, the mountaintop-like portions of the protruding portions correspond to the white areas and portions of the color filter layer on remaining portions of the protruding portions other than the mountain-top-like portions and the bottom portions correspond to the color areas.

17. The reflective display device of claim 15, wherein
the protruding portions protrude in a stepped shape from the bottom portions,
the color areas in the composite color area are on the protruding portions and include a color filter material, and
the white areas in the composite color area are on the bottom portions and do not include a color filter material.

18. The reflective display device of claim 17, wherein top surfaces of at least one of the bottom portions and the protruding portions are curved.

* * * * *